United States Patent [19]

Hoekman et al.

[11] Patent Number: 4,994,714

[45] Date of Patent: Feb. 19, 1991

[54] AUTOMATIC ALTERATION OF THE OPERATION OF A RADIANT ENERGY TRANSMITTER

[75] Inventors: Earl B. Hoekman, Roseville; Karl P. Schaller, both of St. Paul, Minn., Cottage Grove, both of

[73] Assignee: Minnesota Mining and Manufacturing Company, St. Paul, Minn.

[21] Appl. No.: 344,909

[22] Filed: Apr. 28, 1989

[51] Int. Cl.[5] .......................... B60Q 1/26; G08G 1/07

[52] U.S. Cl. ...................................... 315/80; 340/906

[58] Field of Search ................. 315/80, 241 R, 200 A, 315/150, 151, 157; 340/906, 907; 455/117, 127; 307/10.1

[56] References Cited

U.S. PATENT DOCUMENTS

| | | | |
|---|---|---|---|
| 4,016,532 | 4/1977 | Rose | 340/906 X |
| 4,135,144 | 6/1979 | Elmasian | 340/906 X |
| 4,223,295 | 9/1980 | Bonner et al. | 340/906 |
| 4,228,419 | 10/1980 | Anderson | 340/906 |
| 4,234,967 | 10/1978 | Henschel | 455/603 |
| 4,321,507 | 3/1982 | Bosnak | 315/241 R |

*Primary Examiner*—Eugene R. LaRoche
*Assistant Examiner*—Ali Neyzari
*Attorney, Agent, or Firm*—Donald M. Sell; Walter N. Kirn; William B. Barte

[57] ABSTRACT

A radiant energy transmitter for use with a motor vehicle wherein operation of the triggered radiant energy device of the transmitter is altered via an operation altering circuit portion when an alteration initiating switch assumes its alteration mode. Such alteration mode is automatically assumed when the operator carries out an action that is normally done after the motor vehicle is stopped. The operation altering circuit portion continues the altered operation even though the alteration mode of the alteration altering switch is subsequently discontinued.

10 Claims, 7 Drawing Sheets

AUTOMATIC ALTERATION OF THE OPERATION OF A RADIANT ENERGY TRANSMITTER

FIELD OF THE INVENTION

The invention presented herein relates to electronically energized radiant energy transmitters used with priority vehicles for remotely controlling traffic signals and to the automatic alteration of the operation of such transmitters as a control device in response to an action taken by the vehicle operator that is not consciously directed to the alteration of the operation of such a transmitter.

DESCRIPTION OF THE PRIOR ART

Radiant energy signal transmitters for the control of traffic signals are mounted on emergency public safety and police vehicles. A problem can be presented when such an emergency or police vehicle has reached an emergency scene, since continued operation of the radiant energy signal transmitter for control of traffic signals carried by such a vehicle may cause unwanted control by the transmitter of the traffic signals at a nearby intersection as well as presenting an unnecessary load to the electrical system of the vehicle. While this can be averted by having the operator of the vehicle turn the transmitter off, such action requires a conscious effort on the part of the operator. Since the operator of the vehicle may be taking actions dictated by the current situation, turn-off of the transmitter will be overlooked at times. Arrangements have been used wherein automatic turn-off of the transmitter is accomplished without any conscious action on the part of the operator, but such arrangements also caused the transmitter to be turned on, if the action taken by the operator was reversed. For example, a switch has been used that is responsive to the presence of the driver in the seat of the vehicle which allows the transmitter to operate only while the driver is seated. Such an arrangement causes the transmitter to be turned off when the driver leaves the vehicle, but also causes the transmitter to be turned on when the driver returns to his seat so long as the main on-off switch for the transmitter is in the on position. Such arrangements have been limited to the automatic turn-off of the transmitter and, as noted, fail to provide a complete solution to the problems presented when an emergency or police vehicle arrives at a destination with its traffic signal controlling radiant energy transmitter turned on.

SUMMARY OF THE INVENTION

The invention presented herein provides a radiant energy transmitter of the type used with public safety motor vehicles for remotely controlling traffic signals wherein automatic alteration of the operation of the radiant energy transmitter is provided when the operator of the vehicle takes an action that is normally done following stoppage of the vehicle, such alteration being accomplished without any conscious action taken by the operator to initiate the alteration with reversal of the action initiating the alteration having no effect on the alteration made to the operation of the transmitter. Known radiant energy transmitters of the type used with public safety motor vehicles include a triggered radiant energy device and control circuitry for triggering the radiant energy device and supplying electrical energy to the radiant energy when it is triggered with the control circuitry being energized by the electrical system of the motor vehicle via an operator actuated switch The radiant energy transmitter provided by the invention presented herein has an operation altering circuit portion which includes an alteration initiation switch means that is placed so that it automatically assumes an alteration mode when the operator of the vehicle with which the radiant energy transmitter is used takes an action that is normally done following the stoppage of the vehicle to cause such operation altering circuit portion to assume an alteration mode to alter the operation of the transmitter. Such switch means automatically returns to a standby mode when the action taken by the operator to initiate an alteration mode is reversed. Such operation altering circuit portion also includes circuitry which causes the operation altering circuit, when placed in the alteration mode, to remain in the alteration mode even though the alteration initiation switch means is returned to its standby mode after assuming an alteration mode. The alteration initiation switch means can, for example, be positioned to assume the alteration mode in response to movement of the vehicle operator from his seat, opening of the vehicle door on the operator's side of the vehicle, or placement of the parking brake or gear shift control in the "park" position.

One arrangement for an operation altering circuit portion includes a relay connected to the transmitter control circuitry side of the operator actuated switch of the transmitter and in series with the alteration initiation switch means whereby closure of the operator actuated switch and the alteration initiation switch means assuming the alteration mode causes the relay to be energized, the relay having a switch means connected to the relay and the control circuitry which, upon energization of the relay, completes a first circuit providing for energization of the relay, independent of the alteration initiation switch means, so long as the operator actuated switch remains closed with energization of the relay altering the operation of the transmitter such as by interrupting operation of the transmitter control circuitry whereby operation of the radiant energy device is disabled or causing the transmitter control circuitry to provide signals to trigger the radiant energy device so the radiant energy signals are not control signals.

Another arrangement for an operation altering circuit portion is based on the use of solid-state circuitry such as a flip-flop circuit, which is arranged to provide an operation altering function when an alteration initiation switch means is placed in its alteration mode with the altering operation continuing after a reversal of action taken that results in the alteration initiation switch means assuming the alteration mode.

An operation altering circuit portion is also usable with a radiant energy transmitter circuit wherein the alteration to the operation of such circuit portion that is implemented by operation of the operation altering circuit can be selected by an operator.

BRIEF DESCRIPTION OF THE DRAWING

The invention presented herein will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

DETAILED DESCRIPTION

Figure 1:
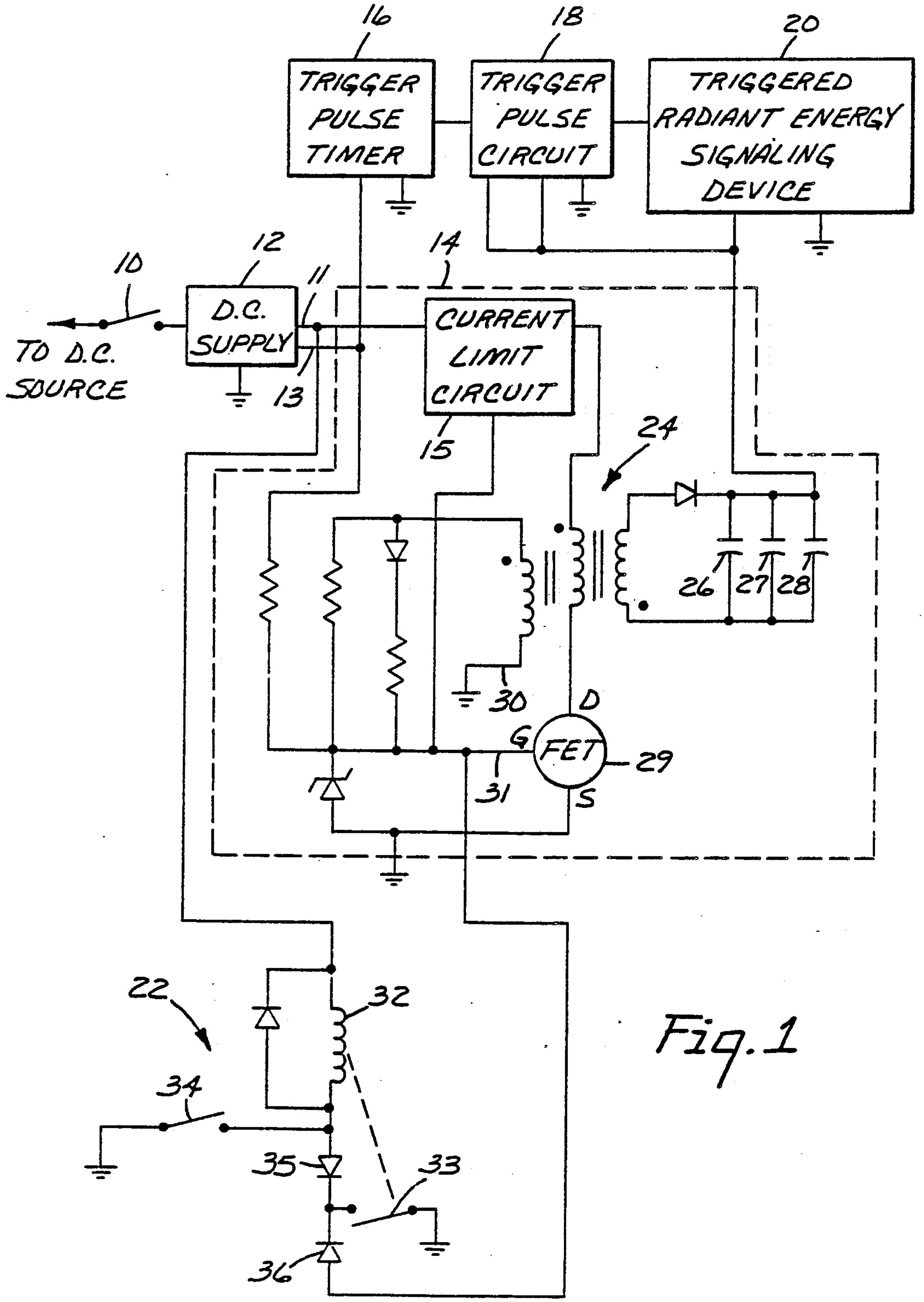
FIG. 1 is a schematic, partially in block diagram form, of a radiant energy transmitter embodying the invention presented herein.

Referring to FIG. 1, a radiant energy transmitter usable with public safety vehicles for the control of traffic signals is shown which embodies the invention presented herein. The transmitter includes an operator actuated switch 10, a d.c. supply 12, a d.c. to d.c. converter and d.c. storage circuit 14, a trigger pulse timer 16, a trigger pulse circuit 18, a triggered radiant energy signaling device 20 and an operation altering circuit portion 22. The portions indicated in block form are shown merely to indicate the various functional circuit portion that are present in known radiant energy transmitters. Details of such circuit portions are not needed for an understanding and disclosure of the invention. A d.c. to d.c. converter and d.c. storage circuit portion is another circuit portion used in present known radiant energy transmitters of the type involved in the invention presented herein. The d.c. to d.c. converter and d.c. storage circuit portion set forth within the dotted line enclosure 14 is provided by way of example for such a circuit portion and is set forth in sufficient detail to illustrate the manner in which the operation altering circuit portion 22 cooperates with the portion 14 to accomplish its function in the transmitter.

As shown in FIG, 1, the radiant energy transmitter circuit is energized from a d.c. source via an operator actuated switch 10. The d.c. source is typically provided by the electrical system of the vehicle with which the transmitter circuit is used. Use of a radiant energy transmitter with a public safety vehicle requires that it be turned on and off at a rapid rate in order for it to be effective in a system for the control of traffic lights, such as a system of the type disclosed in U.S. Pat. No. Re. 28,100 to W. H. Long, which is used by a number of cities and is available from the Minnesota Mining and Manufacturing Company, St. Paul, Minn., U.S.A. The d.c. source is supplied to the d.c. supply 12, which in addition to providing d.c. at its output 11 to the d.c. converter an d.c. storage circuit 14 at the level received at its input, provides d.c. voltage at its output 13 that is of the magnitude needed for operation of semiconductor devices such as are used in the trigger pulse timer 16 and in the d.c. converter and d.c. storage circuit 14. The d.c. to d.c. converter and d.c. storage circuit 14 serves to raise the level of the d.c. voltage that is supplied from the d.c. supply 12 to the primary winding of transformer 24 to a level needed for operation of the triggered radiant energy signaling device 20 which can be gaseous discharge lamp. Such high level d.c. voltage supply is stored by the capacitors 26–28. The capacitors 26–28 are rapidly discharged via the device 20 when the device 20 is triggered to cause it to become conductive. The device 20 is triggered when a pulse is received from the trigger pulse circuit 18 that has an electronic switching device. The switching device can be a silicon controlled rectifier that is turned on each time a signal is received from the trigger pulse timer 16. The timer 16 thus determines the rate at which the radiant energy signaling device is triggered for operation.

The d.c. to d.c. converter 14 includes an electronic semiconductor device, such as the field effect transistor (FET) 29, that is connected in series with the primary winding of transformer 24 for control of current flow through the primary winding. Operation of the d.c. to d.c. converter involves the use of a feedback voltage obtained from a tap connection made at the transformer or by use of a separate winding 30, as is employed in the converter 14. This feedback voltage is used for providing control of the level of conduction of the FET 29 via its gate electrode. The use of a FET as the semiconductor device requires the use of current limiting circuit 15. The use of a semiconductor device, such as the FET 29, in the d.c. to d.c. converter 14 provides a convenient point in the circuitry, which, if connected to ground, interrupts operation of the d.c. to d.c. converter 14 and, therefore, alters the operation of the device 20 by disabling it. In the case of the FET 29, it will not conduct when its gate electrode 31 is connected to ground.

The operation altering circuit portion 22 of the radiant energy transmitter shown in FIG. 1 provides a means by which operation of the radiant energy signaling device 20 is altered in that its operation is automatically terminated when the operator of the vehicle using the transmitter of FIG. 1 takes an action that is normally done after stoppage of the vehicle with such termination continuing even though such action is reversed. Providing such an operation altering means that is automatically made operable is of value. For example, once a public safety vehicle using a radiant energy transmitter of the type described in connection with FIG. 1 reaches the scene of an emergency, it is desirable that any operation of the transmitter be altered, such as by termination, to avoid continued control of the traffic lights at any street intersection. Rather than requiring the operator to take a non-routine action to alter the operation of the transmitter while he is in the vehicle, such as by movement of the operator actuated switch 10 to the open position for a terminating action, it is desirable to have an alteration action initiated in response to an action normally taken by the operator after stoppage of the vehicle Further, it is desirable that it be done in a manner such that the alteration is not automatically terminated when the initiating action taken by the operator is reversed. Such desirable alteration action is provided by the operation altering circuit portion 22.

The operation altering circuit portion 22 shown in FIG. 1 includes a relay 32 and a set of contacts 33 operated by the relay 32. The relay contacts 33 are normally open and move to the closed position when relay 32 is energized. One end of the coil for relay 32 is connected to the output 11 of the d.c. supply 12 which presents the same voltage level as is present at the input to the supply 12. The other end of the relay coil is connected to ground via an alteration initiation switch means, such as switch 34 and to ground via a diode 35 connected in series with the set of relay contacts 33. The operation altering circuit portion 22 provides a ground connection for the gate electrode 31 of FET 29 when the relay contacts 33 are closed. A path to ground from the gate electrode 31 is provided via a diode 36, which has its cathode connected to the connection that is common to the cathode of diode 35 and the set of relay contacts 33. The path to ground for the gate electrode 31 of FET 29 is completed when relay 32 is energized to cause contacts 33 to close. As has been mentioned, grounding of the gate electrode 31 of FET 29 interrupts the flow of current through the primary winding of transformer 24 and the FET 29 thereby disabling the operation of the device 20. The diode 36 is used to isolate the voltage present at the switch 34 end of the relay 32 from the gate of FET 29. The diode 35 serves to isolate the gate of FET 29 from switch 34 to assure that grounding of the gate electrode of FET 29 is due to a properly functioning relay 32. Without the isolating diode 35 a ground connection provided via switch 34 for energizing the relay 32 would interrupt operation of FET 29 if the relay contacts 33 failed to close.

The closure of switch 34 serves to complete the circuit for energization of relay 32 to cause the relay contacts 33 to move to the closed position. The relay contacts 33 provide a switch means, which when operated upon energization of relay 32, provides a path to ground for relay 32 as well as the path to ground for the gate electrode 32 of FET 29. The path to ground for relay 32 that is provided by closure of contacts 33, when relay 32 is energized, keeps the relay 32 energized following a subsequent opening of the switch 34 so long as the operator actuated switch 10 remains closed. The alteration initiation switch means 34 is normally in a standby mode, i.e., open, while the vehicle is moving and assumes an alteration mode, i.e., closed position when the operator of the vehicle takes an action following the stoppage of the vehicle to cause the switch 34 to close. One acceptable position for switch 34 is in the door frame of the door of the vehicle on the operator's side. When the door is closed, such as is the case when the operator is in the vehicle, the switch 34 will be open with the switch 34 moving to the closed position when the operator of the vehicle opens the door to leave the vehicle. Although the switch 34 is moved to the open position by closure of the door after the operator of the vehicle has left the vehicle, the relay 32, which was energized when switch 34 closed in response to the opening of the vehicle door, will remain energized via the holding circuit completed by closure of the relay contacts 33. Another acceptable position for switch 34 is the operator's vehicle seat. The switch 34 would then be one which is open when someone is seated in the operator's vehicle seat and is closed when no one is seated in such vehicle seat. Thus, if the operator actuated switch 10 is closed for operation of the transmitter and the operator of the vehicle is in his seat, the switch 34 is open. If the operator then leaves his seat, switch 34 moves to the closed position to cause relay 32 to be energized causing the relay contacts 33 to close to disable the device 20. Upon return of the vehicle operator to his seat, switch 34 moves to the open position, but relay 32 remains energized via the holding path provided by the closed relay contacts 3. Similarly, the switch 34 could be placed so as to assume an alteration mode position in response to the operator taking an action that is normally done to place the vehicle in a park condition, such as placement of the parking brake or gear shift control in the "park" position.

With the relay contacts 33 remaining closed after the operator of the vehicle has reversed the action taken which automatically placed the switch 34 in the alteration mode, the device 20 remains disabled until the operator opens the operator actuated switch 10. If the switch 10 is opened and then closed, the relay 32 will be deenergized allowing the transmitter to again operate to provide signals for the remote control of traffic signals.

Figure 2:
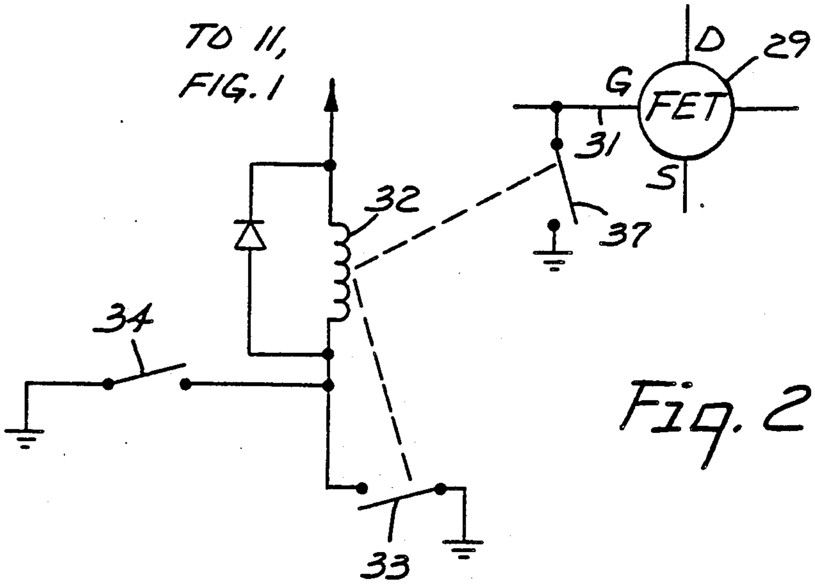
FIG. 2 is another arrangement for a portion of the circuitry of in FIG. 1.

Referring to FIG. 2, another suitable operation altering circuit portion is shown, wherein the reference numerals used in FIG. 1 are also used in FIG. 2 to identify components corresponding to those of FIG. 1. The operation altering circuit portion of FIG. 2, as in FIG. 1, includes a relay 32 which is connectable to ground via a alteration initiation switch 34 and also via the set of relay contacts 33. Unlike FIG. 1, a diode is not used between the relay 32 and the relay contacts 33. The operation altering circuit portion of FIG. 2 requires the use of another set of normally open relay contacts for relay 32 which are identified by the reference numeral 37. As in the case of relay contacts 33, the contacts 37 are normally open and close when the relay 32 is energized. The contacts 37 are connected between the gate electrode 31 of FET 29 and ground. As in the case of the operation altering circuit portion 22 of FIG. 1, closure of switch 34 causes relay 2 to be energized causing a holding circuit to be completed for the relay 32 via the closure of contacts 33 plus the completion of a path to ground for the gate electrode 31 of FET 29 via the closure of contacts 37 to disable the operation of the device 20. The function or result provided by the operation of the operation altering circuit portion 22 of FIG. 1 and that of FIG. 2 for disabling the device 20 is the same.

Figure 3:
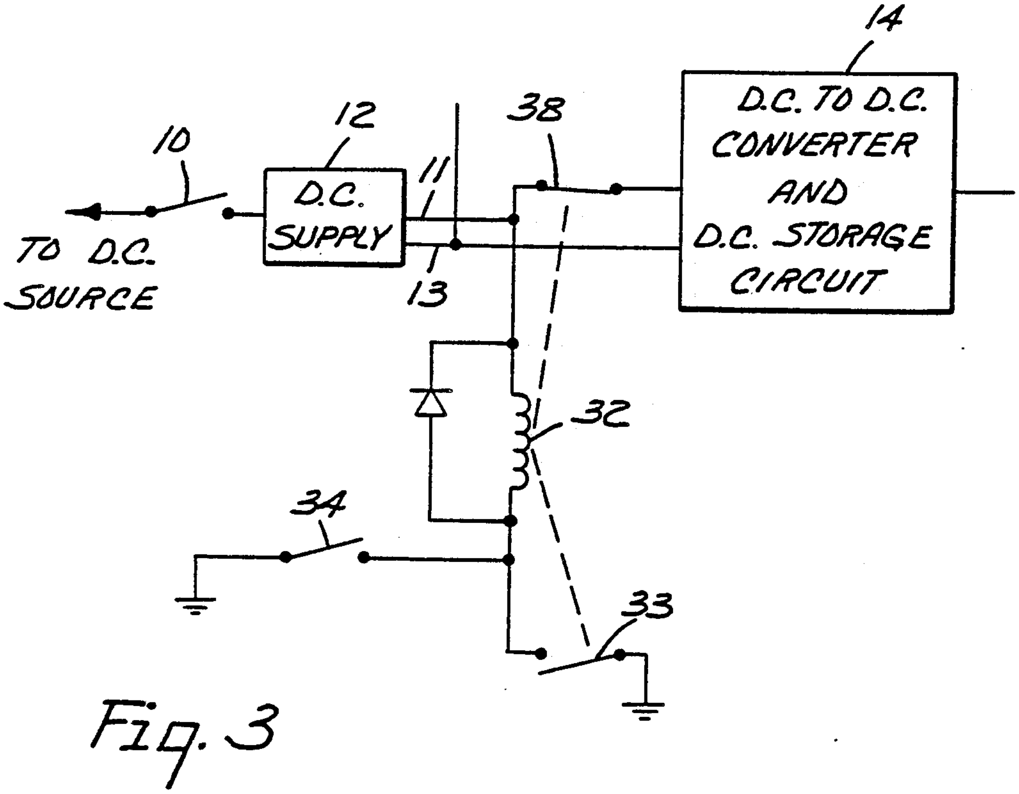
FIG. 3 is a further arrangement for a portion of the circuitry in FIG. 1.

A further suitable operation altering circuit portion for the transmitter is shown in FIG. 3 and is the same as that shown in FIG. 2, except that the normally open relay contacts 37 of FIG. 2 are not used, but with a set of normally closed relay contacts 38 being provided with relay 32. The normally closed relay contacts 38 move to the open position when relay 32 is energized. The relay contacts 38 are connected between the output 11 of the d.c. supply 12 and the d.c. to d.c. converter and d.c. storage circuit 14 to control the supply of d.c. to circuit 14. The winding for relay 32 is connected to the d.c. supply 12 side of contacts 38. With the arrangement of FIG. 3, the operation of device 20 is disabled when relay 32 is energized upon closure of switch 34 and remains disabled even though switch 34 is subsequently opened since the relay is held energized by the closure of relay contacts 33. The function or result of providing for the disabling of the operation of the signaling device 20 by the operation of the operation altering circuit portion shown in FIG. 3 is the same as that provided by the operation altering circuit portion shown in FIG. 1 and 2.

Figure 4:
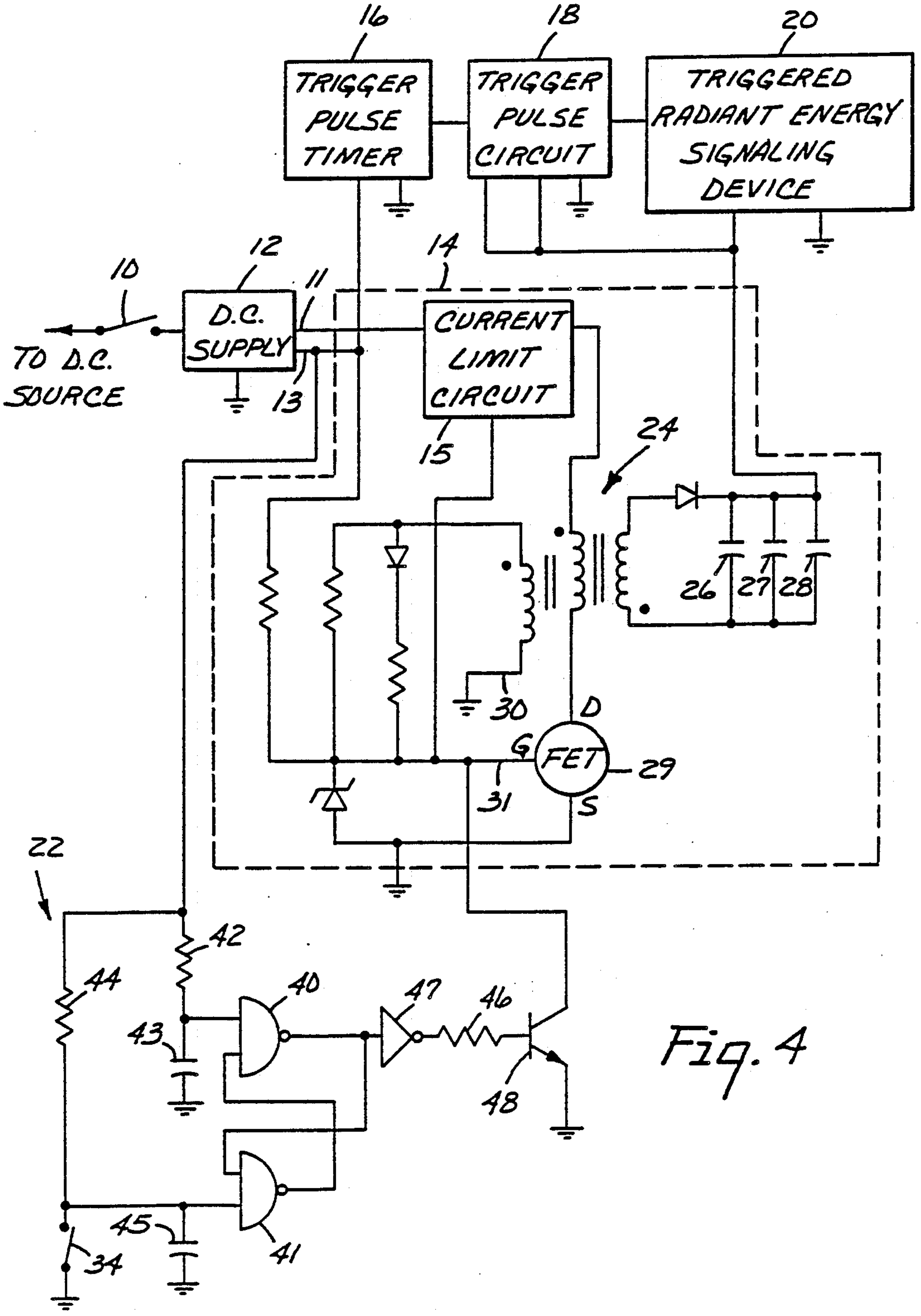
FIG. 4 is an additional arrangement for a portion of the circuitry of FIG. 1.

Referring to FIG. 4, the circuitry shown is the same as for FIG. 1, except that the operation altering circuit portion 22 of FIG. 1 which is based on the use of a relay, is replaced by an operation altering circuit portion 22 that is based on solid-state devices. Like the operation altering circuit portion of FIG. 1, the portion 22 of FIG. 4 uses a like alteration initiation switch means 34 which is automatically placed in an alteration mode, i.e., closed position in response to an action normally taken by the operator of a vehicle after it has been stopped to cause the operation altering circuit portion 22 to operate to alter the operation of the signaling device 20.

The operating altering circuit portion 22 of FIG. 4 includes a flip-flop circuit that has two NAND circuits 40 and 41. The output for each of the NAND circuits is connected to one of the two inputs for the other NAND circuit. The other input of NAND circuit 40 is connected via a resistor 42 to the output 13 of the d.c. supply 12 and to ground via a capacitor 43. The other input of NAND circuit 41 is similarly connected to the d.c. supply 12 via a resistor 44 and is connected to ground via a capacitor 45 and also via another path that includes alteration initiation switch 34. The output of NAND circuit 40 is connected to a semiconductor switching device 48 via an inverter circuit 47 in series with a resistor 46. The device 48 can be a NPN type transistor as shown in FIG. 4. The output of the inverter 47 is connected via the resistor 46 to the base electrode of the transistor 48 which has its emitter electrode connected to ground and its collector electrode connected to the gate 31 of FET 29. The conduction of FET 29 is terminated whenever the transistor 48 conducts.

With circuitry mounted for operation with a vehicle, such as a police vehicle, and with the operator in position for operation of the vehicle, the switch 34, which is positioned as previously described for FIG. 1, will be open. If the switch 10 is then closed, the output of NAND circuit 40 will be high causing the inverter 47 to present a low to transistor 48 causing it to be non-conducting. This being the case, the signaling device 20 will flash on and off at a rate determined by the trigger pulse timer 16. If the operator then takes an action which automatically results in the closure of switch 34, the output of NAND circuit 40 will go low causing the output of the inverter 47 to be high to turn on the transistor 48 and thereby ground the gate of FET 29 to terminate its conduction and thereby terminate operation of the device 20. If the action resulting in the closure of switch 34 is reversed, while the switch 10 remains closed, the output of the inverter 47 remains high keeping the transistor 48 on and thereby maintaining the FET 29 at ground. The device 20 will remain inoperative until the switch 10 is opened and then closed causing the transistor 48 to be turned off and remain off until the switch 34 is again closed. The circuit portion 22 of FIG. 4 is thus an example of a solid-state circuit that can be used to carry out the same function and result as the circuit portion 22 of FIGS. 1–3.

The embodiments of the invention as set forth in FIGS. 1–4 are usable with an alteration initiation switch means, such as switch 34, with each arrangement being effective only to terminate the operation of the signaling device 20 when the switch 34 is closed with such termination continuing if the switch 34 is subsequently opened while power is still being supplied to the d.c. supply 12.

Figure 5:
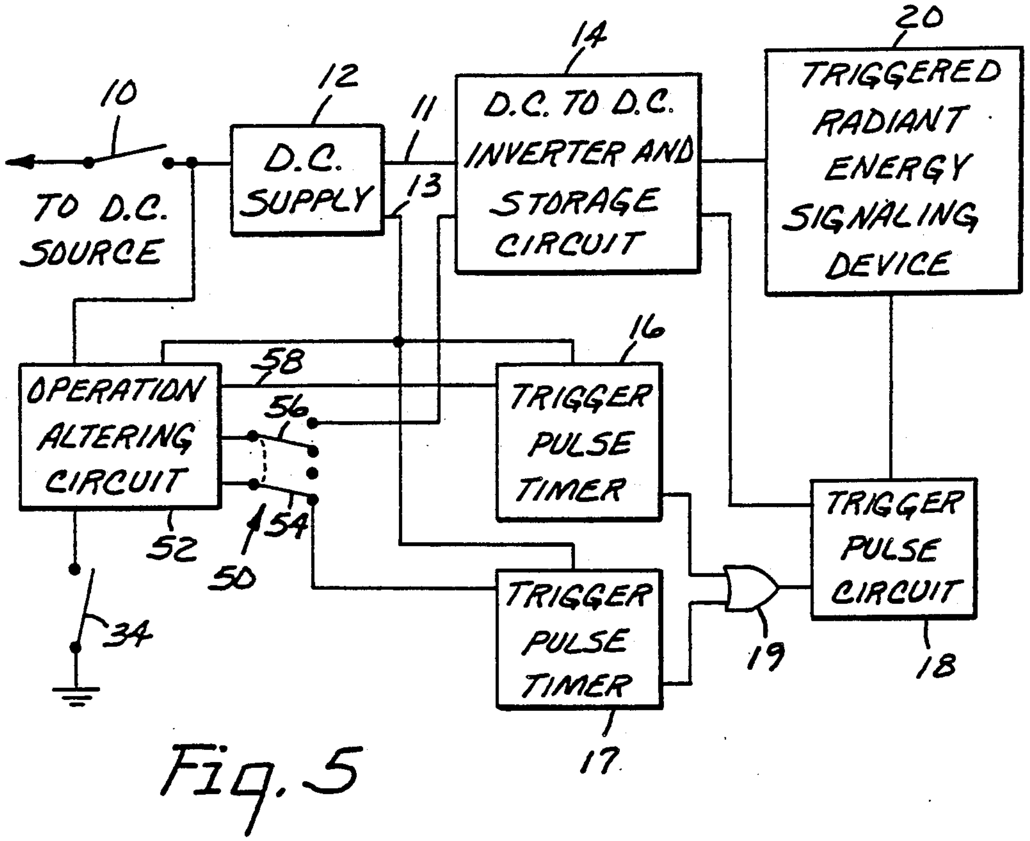
FIG. 5 is a schematic in block diagram form of a radiant energy transmitter which is similar to that shown in FIG. 1 with provision made for selective operation.

It is desirable to have an arrangement wherein operation of the alteration initiation switch means 34 is effective with any operation altering circuit to terminate operation of the signaling device or cause it to provide signals that are different that those provided prior to the alteration initiation switch assuming the alteration mode position. Reference is made to FIG. 5, wherein a radiant energy transmitter circuit is shown that is somewhat similar to that shown in FIG. 1. Components of the circuitry of FIG. 5 that are the same as those appearing in FIG. 1 are identified using the same reference numerals as are use in FIG. 1. Like FIG. 1, the circuitry of FIG. 5 includes an operator actuated switch 10, a d.c. supply 12 having two outputs 11 and 13, a d.c. to d.c. converter and d.c. storage circuit 14, a trigger pulse timer 16, a trigger pulse circuit 18 and a triggered radiant energy signaling device 20 which are connected to operate as described in connection with FIG. 1 when the device 20 is triggered by the trigger pulse circuit 18 when it receives a pulse from the timer 16. Unlike the circuit of FIG. 1, the trigger pulse timer 16 has its output supplied to the trigger pulse circuit 18 via an OR circuit 19 since a second trigger pulse timer 17 is used also in the circuit of FIG. 5. Like timer 16, timer 17 has its output connected to the trigger pulse circuit 18 via the OR circuit 19. The second trigger pulse timer 17 is arranged to provide signals that are spaced differently from those provide by timer 16. As will be explained, only one of the timers 16 and 17 can be operative at any time to supply signals to the trigger pulse circuit 18.

The circuitry of FIG. 5 also includes a manually operated two-pole double throw switch 50, an operation altering circuit 52 and an alteration initiation switch 34. The switch 34 is like the switch 34 used in the circuitry described for FIGS. 1–4 in that it automatically assumes an alteration mode position in response to a particular action that is normally taken by the operator of a vehicle with which the transmitter circuitry is used after the vehicle is brought to a stop. The switch 50 allows the operator to determine the type of alteration in the operation of the signaling device 20 that is desired when it has been operating under the control of the timer 16 and the switch 34 is operated to cause the operation altering circuit 52 to operate. In a first position, shown in FIG. 5, the switch 50 provides for use of the timer 17 in place of the timer 16 for controlling the operation of signaling device 20 when the switch 34 closes. In this position with its lower movable contact 54 contacting the lower fixed contact, switch 50 is connected to the timer 17. The upper movable contact 56 is then positioned away from the upper fixed contact of switch 50 which is connected to the d.c. inverter and storage circuit 14. A conductor 58 connects the operation altering circuit 52 to the timer 16. In the second or other possible position for switch 50 with its upper movable contact 56 in contact with its upper fixed contact and the lower movable contact 54 positioned away from its lower fixed contact, the switch 50, upon operation of the operation altering circuit 52 due to closure of switch 34, provides for a termination of the operation of the signaling device 20 which is then under the control of timer 16.

Figure 6:
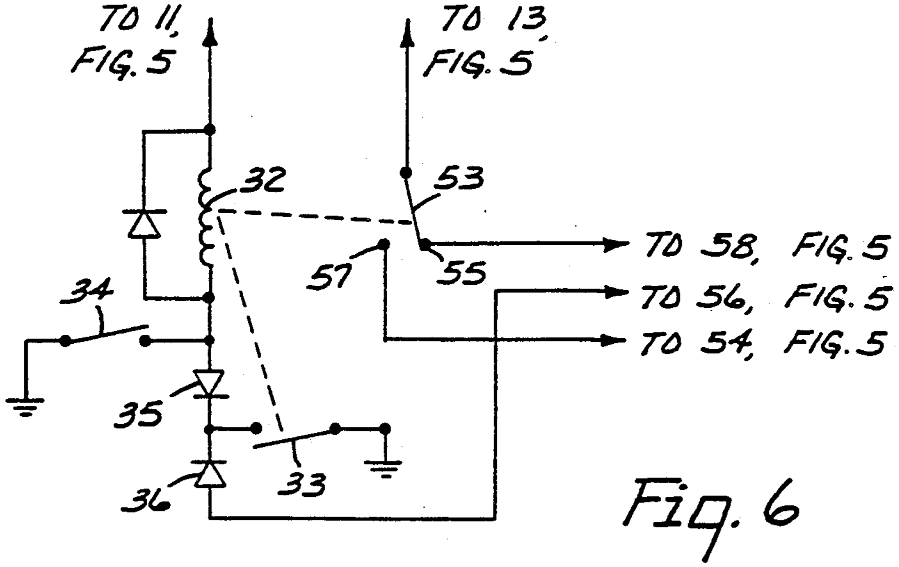
FIG. 6 is the detailed schematic of a circuit usable as the operation altering circuit portion of the transmitter of FIG. 5.

The operation altering circuit 52, which is shown in FIG. 6, is the same as the operation altering circuit 22 of FIG. 1, except that the relay 32 is provided also with a movable contact 53 that moves from a position in contact with a fixed contact 55 when the relay is not energized to a position in contact with fixed contact 57. The elements of circuit 52, that are the same as those used for the circuit portion 22 of FIG. 1, are identified with the same reference numerals used in FIG. 1. The movable contact 53 has its fixed end connected to the output 13 of the d.c. supply 13. When the switch 50 is in its second position to place the movable contact 56 in contact with its upper fixed contact, the anode of diode 36 is, as in FIG. 1, connected to the d.c. to d.c. inverter and storage circuit 14 and specifically to the gate of FET 29 as shown in FIG. 1. The fixed contact 55 is connected to the timer 16 via the conductor 58 while fixed contact 57 is connected to the movable contact 54 of switch 50 which is used to complete a circuit to timer 17 when the switch 50 is in its first position, as shown in FIG. 5.

The timers 16 and 17, details of which will be discussed later, operate to supply signals to the trigger pulse circuit 18 only when they are receiving a high signal. In the case of FIG. 5 this is provided by the voltage at the output 13 of the d.c. supply that is routed to timer 16 via the relay contact 53 when in contact with its fixed contact 55 and to timer 17 via the relay contact when in contact with its fixed contact 57 and provided the switch 50 is in its first position as shown in FIG. 5.

If the transmitter circuitry of FIG. 5 is placed in operation by closure of the switch 10, switch 34 will be open and timer 16 will be operating as it will then be connected to the output 13 of the d.c. supply 12 via the relay contacts 53 and 55. This situation is presented regardless of the position the operator has placed switch 0. If switch 50 is left in its first position, as shown in FIG. 5, and switch 34 is closed, as described in connection with the circuitry of FIG. 1, relay 32 is energized and is held energized by the holding circuit provided via diode 35 and the closed relay contact 33 which is connected to ground.

Energization of the relay 32 causes the movable contact 53 to move from fixed contact 55 removing the voltage from timer 16 that was supplied via the contacts 53 and 55 causing the time 16 to cease supplying signals to the trigger pulse circuit 18. The movable contact 53 is brought in contact with the fixed contact 57 to provide the d.c. voltage available at the output 13 of the d.c. supply 12 to the timer 17 via the movable contact 54 and its lower fixed contact to cause the timer 17 to supply signals to the trigger pulse circuit 18. Operation of the circuitry of FIG. 5 is thus altered so the signaling device 20 is triggered under the control of the timer 17 rather than timer 16.

If switch 50 had been placed in its second position, which moves movable contact 54 away from its lower fixed contact and movable contact 56 into contact with its upper contact, the operation of the circuit of FIG. 5 would have been altered when switch 34 closed to terminate operation of the device 20. In this case the energization of relay 32, due to the closure of switch 34, connects the gate of the FET 29 that is a part of the circuit portion 14 to ground to terminate operation of the device 20. Such ground connection would be completed since movable contact 56 is then in contact with its upper fixed contact which is connected to the circuit portion 14 and specifically to the gate of FET 29 therein.

Figure 7:
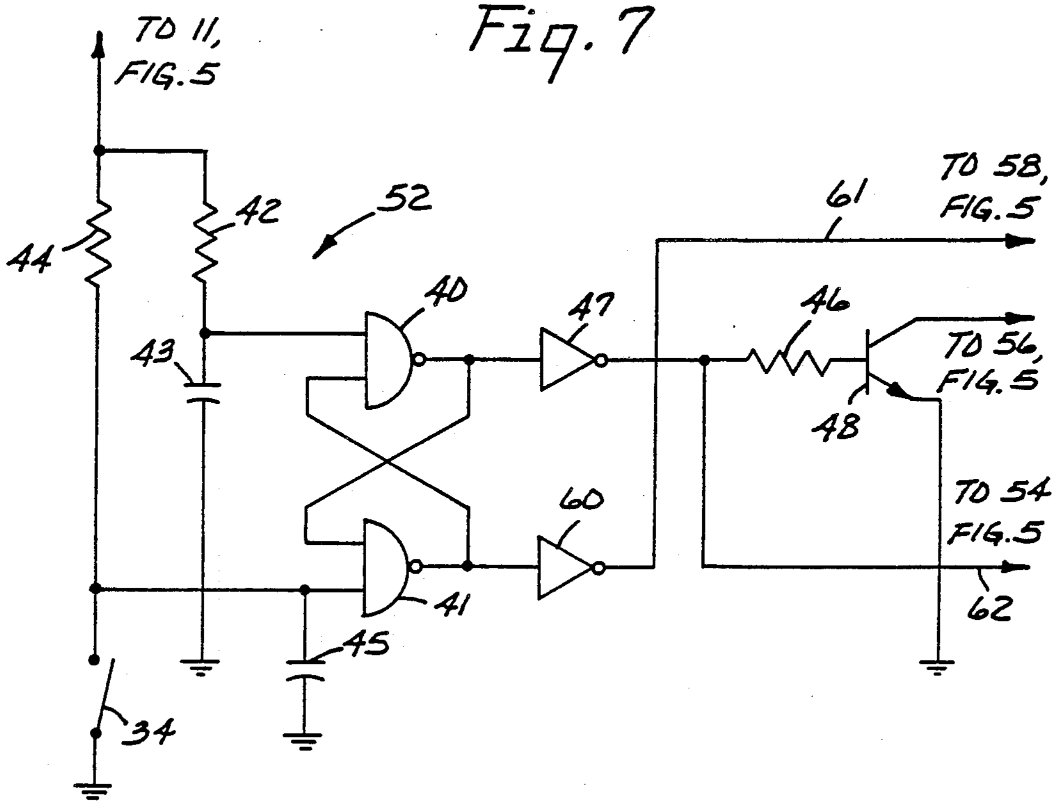
FIG. 7 is the detailed schematic of another circuit usable as the operation altering circuit portion for the transmitter of FIG. 5.

Referring to FIG. 7 another circuit is shown that can be used for the operation altering circuit 52 of FIG. 5. It is same as the circuit portion shown for the operation altering circuit 22 of FIG. 4 except that an inverter 60 is connected to the output of the NAND circuit 41 and a conductor 62 has been added that connects to the output of inverter 47. The switch 34 of FIG. 4 is shown connected to the operation altering circuit 52 of FIG. 7. Elements of the circuit of FIG. 7 that correspond to elements in the circuit portion 22 of FIG. 4 are identified using the same reference numerals as are used in FIG. 4. The output of inverter 60 connects with timer 16 and allows or enables timer 16 to provide signals to the trigger pulse circuit 18 when the output of inverter 60 is high. The collector of transistor 48 is connected to the movable contact 56 of switch 50 and the conductor 61 is connected to the movable contact 54 of switch 50. When switch 50 is in its first position, as shown in FIG. 5, the timer 17 is enabled to provide signals to the trigger pulse circuit 18 when the output of inverter 47 is high.

As was described in connection with FIG. 4, with the circuitry of FIG. 5 and using the circuitry of FIG. 7 mounted for operation with a vehicle and with the operator in position for operation of the vehicle, the alteration initiation switch 34 will be open. If the switch 10 is then closed, the output of NAND circuit 40 will be high and the output of NAND circuit 41 will be low. Inverter 47 output will then be low and inverter 60 output high. This situation is presented regardless of the position the operator has placed switch 50. At this point the timer 16 will operate to supply signals to the trigger pulse circuit 18 since the high signal present at the output of inverter 60 is supplied to the timer 16. If the operator then takes action which automatically results in the closure of the alteration initiating switch 34, the output of inverter 60 will go low preventing the timer 16 from supplying signals to the trigger pulse circuit 18 and the output of inverter 47 will go high.

Assuming switch 50 is then in its first position as shown in FIG. 5, the transistor 48 will not conduct in response to the high presented to its base from the inverter 47 since an open circuit is then present at the contact 56 which is connected to the collector of transistor 48. The high present at the inverter 47 is, however, applied to the timer 17 via the switch contact 54 of switch 50 to enable operation of the timer 17 for the supply of signals to the trigger pulse circuit 18 so that the device 20 is turned on and off in accordance with the signals from timer 17. If the switch 50 were in its second position to present a closed circuit at switch contact 56 and an open circuit at the switch contact 54, the high at inverter 47 caused by closure of switch 34 would not be presented to timer 17, but would be effective to cause transistor 48 to conduct thereby grounding the gate of the FET 29 in the d.c. to d.c. inverter portion of circuit 14 to terminate operation of the device 20.

As is apparent from the explanation given regarding the operation of the circuits of FIGS. 6 and 7, the two circuits, though different in structure, provide the same function and result that is required for a suitable operation altering circuit 52 for the circuit shown in FIG. 5.

Figure 8:
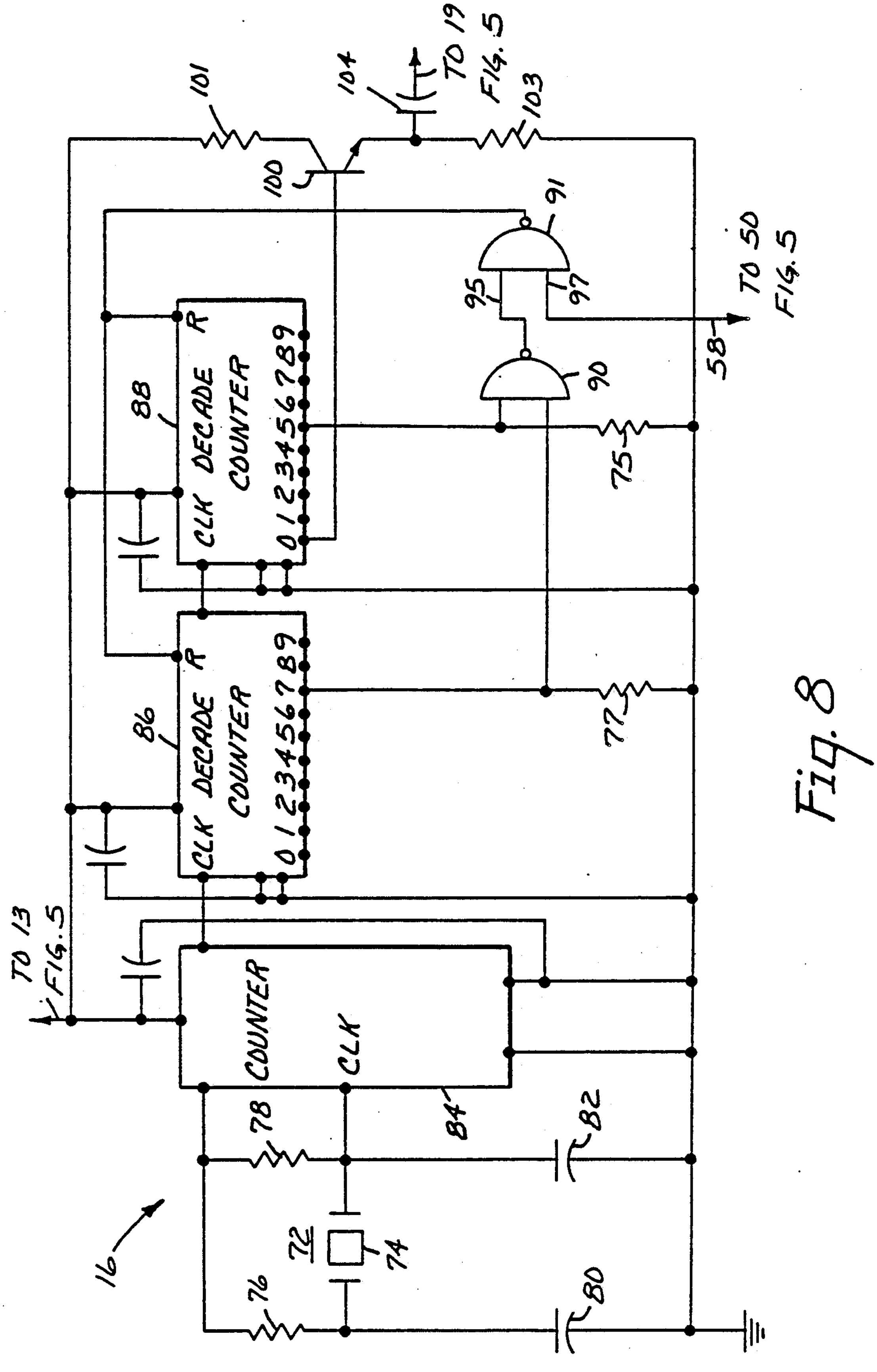
FIG. 8 is the detailed schematic of a timer usable as one of the trigger pulse timers for the transmitter of FIG. 5.
Figure 9:
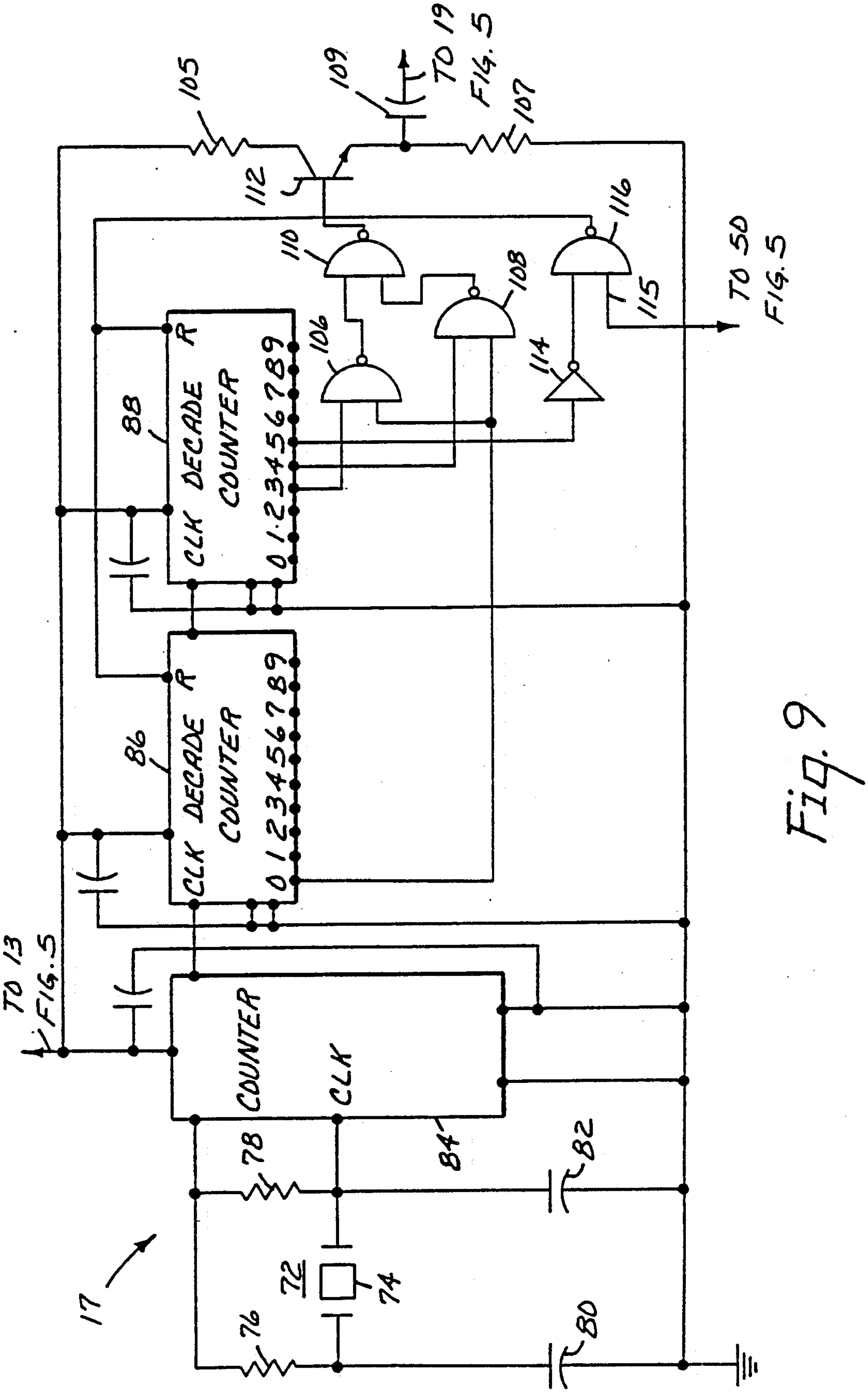
FIG. 9 is the detailed schematic of a timer usable as the other trigger pulse timer for the transmitter of FIG. 5.

Exemplary timer circuits for the timers 16 and 17 in FIGS. 5 are shown in FIGS. 8 and 9, respectively.

Referring to FIG. 8, the trigger pulse timer 16 includes a crystal oscillator 72 having a crystal 74 plus resistors 76 and 78 and capacitors 80 and 82. Resistor 76 and capacitor 80 are connected in series as are resistor 78 and capacitor 82 with capacitors 80 and 82 connected to ground and the resistors 76 and 78 connected to a counter 84 that is included as a part of the portion of trigger pulse timer 16. The connection common to resistor 76 and capacitor 80 is connected to one side of the crystal 74 with the connection common to resistor 78 and capacitor 82 similarly connected to the other side of crystal 74 and to the clock input of the counter 84. The counter 84 includes an amplifier and is used to divide the frequency of the crystal oscillator to obtain a desired base time signal. The counter can be provided by a digital type of counter circuit available under the type designation 4060B from Motorola, Inc., Semiconductor Products Sector, 3102 North 56th Street, Phoenix, Ariz. 85018. In the case where a base time signal is desired that is repeated every 1.25 milliseconds, the crystal oscillator 72 having a frequency of 3.2768 megahertz can be used with the counter 84 serving to divide such frequency by 4096 or $2^{12}$ to obtain such base time signal. If the frequency of the signal from counter 84 is then divided by 57, a signal will be provided every 71.25 milliseconds which is used for a commercially available remote control system for the remote control of a control system for a traffic intersection.

Establishing the divisor 57 is easy in that the timer 16 includes two decade counters 86 and 88 wherein counter 86 is connected to receive the signals from counter 84 to provide a units count at its outputs that are numbered 0–9. Decade counter 86 in turn is connected to counter 88 for receiving a signal for every ten signals received by counter 86 to provide a tens count at its outputs that are numbered 0–9. The 5 output count of decade counter 88 is connected to one input of a NAND circuit 90 and also to ground via a resistor 75, with the 7 output count of decade counter connected to the other input of the NAND circuit 90 and also to ground via a resistor 77. This connection of the tens count output 5 of counter 88 and of the units count output 7 of counter 86 to the AND circuit 90 causes the frequency of the signal from counter 84 to be divided by 57. This means the time between signals at the output of the NAND circuit is 57 times the time between the base time signals provided to the counter 86 from the counter 84. The output of NAND circuit 90 is supplied to one input 95 of a second NAND circuit 91 which has a second input 97 connected to the operation altering circuit 52 of FIG. 5 via the conductor 58. As indicated with respect to the circuits of FIG. 6 and FIG. 7, which are usable as operation altering circuits 52 of FIG. 5, a high signal is presented on conductor 58 when the timer 16 is operating to provide signals. With such high signal being presented via conductor 58 to the second input 97 of NAND circuit 91, a high signal will be produced at the output of NAND circuit 91 when the output of NAND circuit 90 is low which will occur when a high is present at each of the count outputs 5 and 7 of counters 88 and 86, respectively.

The trigger pulse timer circuit 16 also includes an electronic switching device 100, which can take the form of a transistor, such as the NPN type transistor shown in FIG. 8. The transistor 100 has its collector electrode connected via a resistor 101 to the output 13 of d.c. supply 12 of FIG. 5 and to ground via a resistor 103. It is turned on when a positive going signal is supplied to it from the NAND circuit 91, as indicated above, i.e., when a high is present at each of the counter outputs 5 and 7 of counters 88 and 86, respectively. The transistor 100 has its emitter electrode connected via a capacitor 104 to the OR circuit 19 of FIG. 5 to provide a signal to the trigger pulse circuit 18 for creating a trigger pulse to trigger the device 20.

When a low signal is supplied via conductor 58 to the NAND circuit 91, which will occur when the alteration initiation switch 34 has been closed, a high signal will be present at the output of NAND circuit 91 to hold the counters 86 and 88 reset thereby disabling the operation of timer 16.

Turning to FIG. 9, which is an exemplary circuit for timer 17, the timer 17 circuitry is the same a that described for timer 16 of FIG. 8 except that it is connected to provide a different base time and differs with respect to the circuitry connected to the counter outputs of counters 86 and 88 and the circuitry providing for the resetting of such counters. Accordingly, the reference numerals used in FIG. 8 are also used in FIG. 9 to identify like components.

The unit output "0" of counter 86 is used with the tens output "3" and "4" of counter 88 to cause the timer 17, when it is enabled, to provide two signals to the OR circuit 19 of FIG. 5 following each resetting of the counters 86 and 88. As will be explained, when the timer 17 is enabled, the counters 86 and 88 are reset each time a high signal is presented at the output "5" of the counter 88. The circuitry connected for responding to the output "0" of counter 86 and the "3" output of counter 88 includes three NAND circuits 106, 108 and 110 plus an electronic switching device 112, shown as an NPN transistor with its collector electrode connected via a resistor 105 to the output 13 of d.c. supply 12 of FIG. 5 and with its emitter electrode connected to ground via a resistor 107. The emitter electrode is also connected to a capacitor 109 for supplying a signal to the OR circuit 19 of FIG. 5 when the transistor 172 is turned on.

The NAND circuit 110 has one input connected to the output of NAND circuit 106 and its other input to the output of NAND circuit 108. The output of NAND circuit 110 is connected to the base electrode of transistor 112. NAND circuits 106 and 108 each have an input connected to the "0" output of counter 86. The other input of NAND circuit 106 is connected to the "3" output of counter 88. The other input of NAND circuit 108 is connected to the "4" output of counter 88.

The circuitry connected to the "5" output of counter 88 includes an inverter 114 and a NAND circuit 6. The inverter 114 connects the "5" output to one input of NAND circuit 116 which has its other input 11 connected to the manually operated switch 50. The input 5 of NAND 116 receives a high signal only when switch 34 (FIG. 5) has been closed and the switch 50 is in the position shown in FIG. 5 wherein the movable contact 54 is in contact with the lower fixed contact. At all other times a low signal is presented to input 115 of NAND 116 causing the output of the NAND 116 to be high. The output of NAND circuit 116 is connected to the reset input of counters 86 and 88. The counters 86 and 88 are reset so long as the input 115 of NAND 116 is low to disable operation of the timer 17.

Assuming a high signal is presented to the NAND 16 thereby enabling the operation of the timer 17, when a count of 30 is reached to present a high at each of the inputs to NAND 106, a low is produced at the output of NAND 106 for one input of NAND 110 which then has a high present at its other input from the output of NAND 108. The output of NAND 108 is high since it is then receiving a low signal from output "4" of counter 88 and a high from output "0" of counter 86. With a high and low signal presented to NAND 110, its output goes high to cause transistor 112 to conduct and thereby supply a signal to the OR gate 19 of FIG. 5 resulting in the triggering of the device 20. A count of 40 is then reached to cause a high to be present at each of the inputs to NAND 108 causing its output, which is connected to NAND 110, to go low. A high is also presented to one input of NAND 106 at the same time from the "0" output of counter 86 while a low is presented to the other input of NAND 106 from output "3" of counter 88. The output of NAND 106 will therefore be high. With a high and low signal presented to the NAND circuit 110, its output will be high to cause transistor 112 to conduct and thereby supply a signal to the OR gate 19 of FIG. 5 to again cause the device 20 to again be triggered for conduction. A count of 50 will subsequently be reached to cause a high to be presented at the "5" output of counter 88 which will be presented as a low to the NAND circuit 116 via the inverter 114 causing a high to be presented from the output of NAND 116 to the reset of the counters 86 and 88. Upon counter 88 being reset, the "5" output goes low to terminate the reset signal, allowing the timing count to begin again and repeat the sequence of operation described above for timer 17.

While the timer 17 has been described using connections providing counts of 30, 40 and 50, it should be appreciated that such connections were used to merely illustrate its operation as a usable circuit for timer 17 in FIG. 5.

While the various circuits have been described wherein only a single alteration initiation switch 34 is shown, more than one alteration initiation switch can be connected in parallel, each switch being associated with a different action that the operator normally takes after stopping the vehicle to place it in an alteration initiation mode thereby assuming that the desired alteration is initiated after the vehicle is stopped.

The particulars of the foregoing description are provided merely for purposes of illustration and are subject to a considerable latitude of modification without departing from the novel teachings disclosed therein. Accordingly, the scope of this invention is intended to be limited only as defined in the appended claims, which should be accorded a breadth of interpretation consistent with this specification.

We claim:

1. A radiant energy transmitter for use with a motor vehicle, the transmitter having a triggered radiant energy device and control circuitry for triggering the radiant energy device and supplying electrical energy to the radiant energy device when it is triggered with the control circuitry being energized via an operator actuated switch including:

an operation altering circuit portion for altering the operation of the triggered radiant energy device;

an alteration initiation switch means connected to said operation altering circuit portion, said alteration initiation switch means automatically assuming an alteration mode when the operator of the vehicle with which the radiant energy transmitter is used takes an action that is normally done following the stoppage of the vehicle, the alteration mode of said alteration initiation switch means being discontinued when the action taken by the operator is reversed; said alteration initiation switch means causing said operation altering circuit portion to operate to alter the operation of the triggered radiant energy device when the alteration mode position of said alteration initiation switch means is assumed with the altered operation continuing even though the alteration mode position of said alteration initiating switch means is subsequently discontinued.

2. A radiant energy transmitter according to claim 1 wherein said operation altering circuit portion includes a relay connected to the control circuitry side of the operator actuated switch and to said alteration initiation switch means whereby closure of said operator actuated switch plus said alteration initiation switch means, when in its alteration mode, causes said relay to be energized, said relay having a switch means connected to said relay and the control circuitry, said switch means being operated while said relay is energized to provide for energization of said relay so long as the operator actuated switch remains closed and the alteration of the operation of the control circuitry whereby operation of the triggered radiant energy device is discontinued.

3. A radiant energy transmitter according to claim 1 wherein said operation altering circuit portion includes a relay connected to the control circuitry side of the operator actuated switch and to said alteration initiation switch means whereby closure of said operator actuated switch plus said alteration initiation switch means, when in its alteration mode, causes said relay to be energized, said relay having a switch means connected to said relay and the control circuitry, said switch means being operated while said relay is energized to complete a first circuit providing for energization of said relay so long as the operator actuated switch remains closed and to change a second circuit to alter the operation of the control circuitry whereby operation of the triggered radiant energy device is altered.

4. An improved radiant energy transmitter according to claim 3 wherein said first and second circuits are connected to a common connection via said switching means for completing said first circuit and changing said second circuit, said first circuit having a first diode connected between said switching means and said relay for isolating said second circuit from said relay.

5. An improved radiant energy transmitter according to claim 3 wherein said switching means includes a first set of electrical contacts which are operated to a closed position while said relay is energized to complete said first circuit and a second set of electrical contacts which are operated to change a second circuit while said relay is energized to alter operation of the control circuitry and the triggered radiant energy control device.

6. An improved radiant energy transmitter according to claim 5 wherein second set of electrical contacts are operated to a closed position while said relay is energized.

7. An improved radiant energy transmitter according to claim 5 wherein said second set of electrical contacts are operated to an open position while said relay is energized.

8. A radiant energy transmitter according to claim 1 wherein said operation altering circuit portion includes a semiconductor switch device that receives a signal causing it to conduct when said alteration initiation switch means assumes an alteration mode, said semiconductor switch device connected to the control circuitry for altering the operation of the triggered radiant energy device in response to the conduction of said semiconductor switch device.

9. A radiant energy transmitter according to claim 1 further including operator controlled selection circuitry for selecting the altered operation of the triggered radiant energy device that is initiated by said operation altering circuit portion when the alteration mode of said alteration initiation switch means is assumed.

10. A radiant energy transmitter according to claim 9 wherein said operator controlled selection circuitry has one position that provides for termination of the triggered radiant energy device as one altered operation of the triggered radiant energy device and a second position that provides for operation of the triggered radiant energy device at a rate that differs from the rate used before the altered operation is implemented.

* * * * *